Dec. 28, 1954
C. S. KELLEY
2,697,881
MEANS FOR DISPLACING HYDROCARBON VAPORS
FROM A FLUIDIZED SPENT CATALYST
Filed Dec. 22, 1950
2 Sheets-Sheet 1
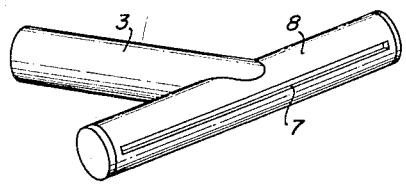
FIG. IA.
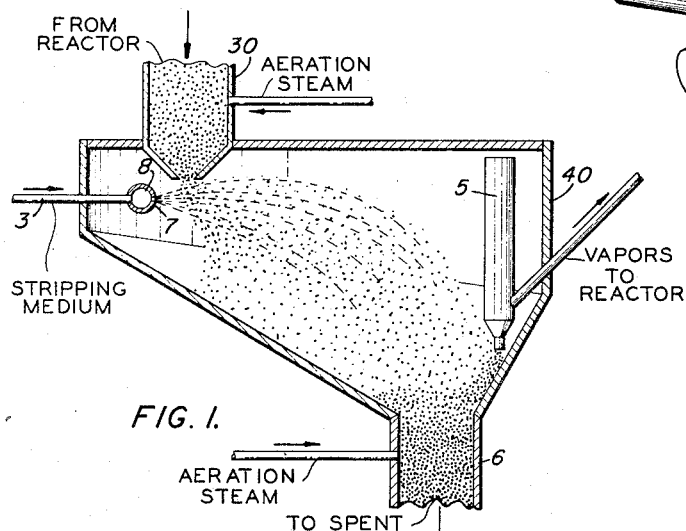
FIG. I.
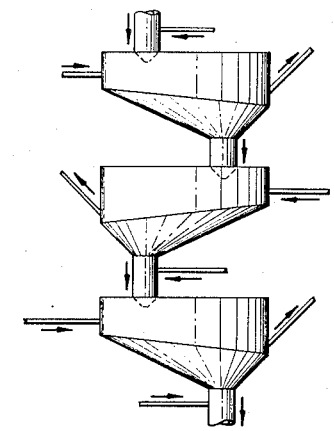
FIG. IB.
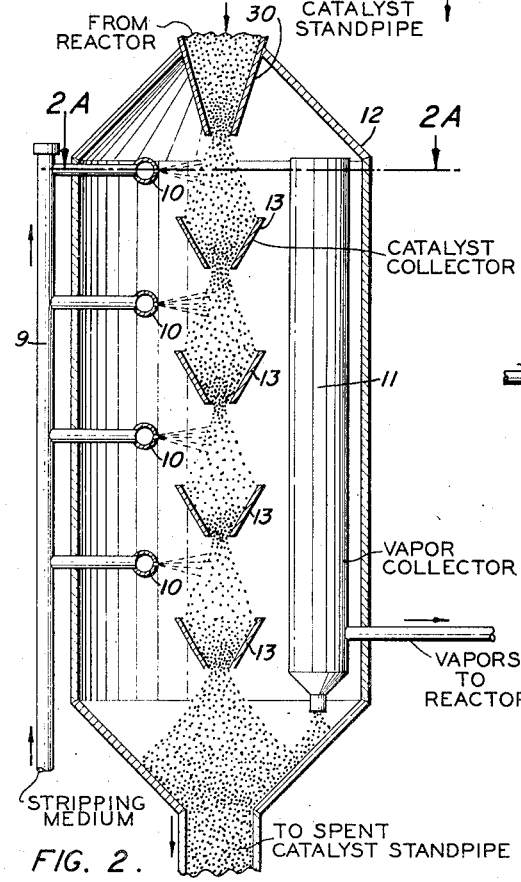
FIG. 2.
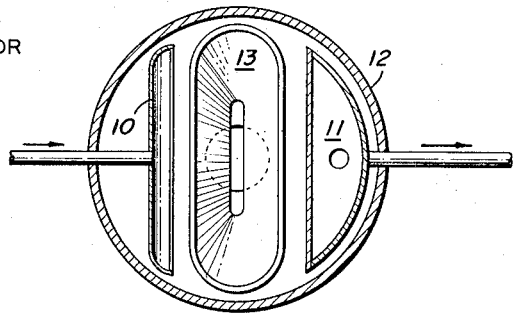
FIG. 2A.
INVENTOR.
C. S. KELLEY
BY
Hudson and Young
ATTORNEYS Dec. 28, 1954 — C. S. KELLEY — 2,697,881
MEANS FOR DISPLACING HYDROCARBON VAPORS
FROM A FLUIDIZED SPENT CATALYST
Filed Dec. 22, 1950 — 2 Sheets-Sheet 2
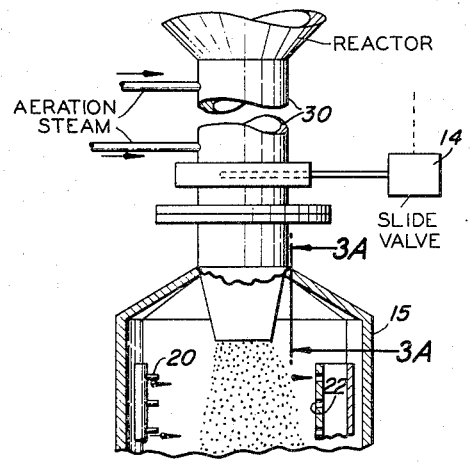
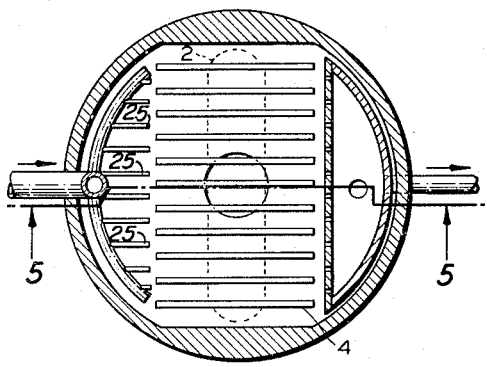
FIG. 4.
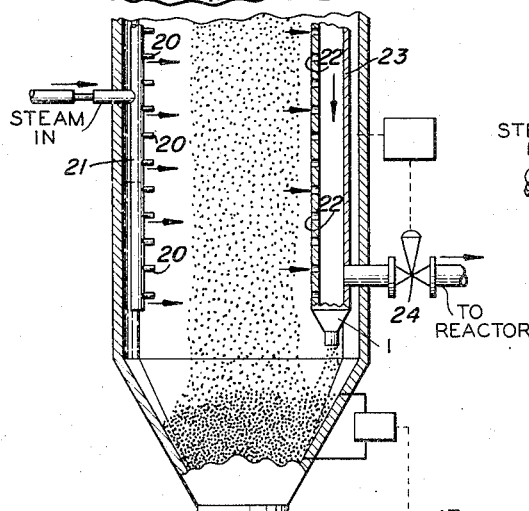
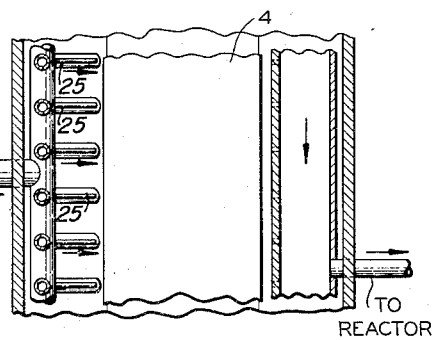
FIG. 5.
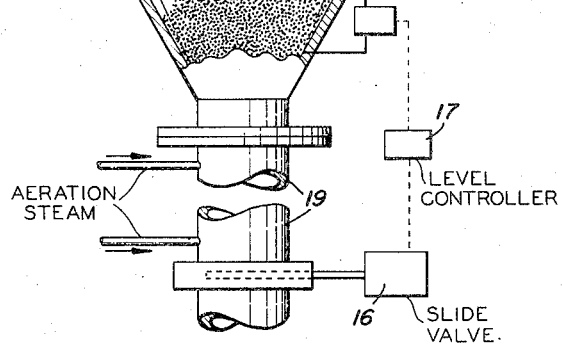
FIG. 3.
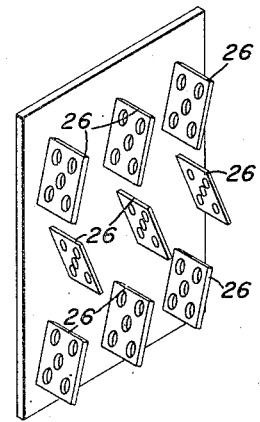
FIG. 6.
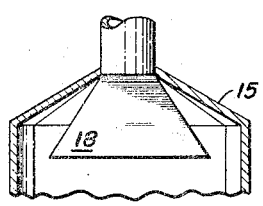
FIG. 3A.
INVENTOR.
C. S. KELLEY
BY
Hudson and Young
ATTORNEYS

# United States Patent Office 2,697,881
Patented Dec. 28, 1954

2,697,881
MEANS FOR DISPLACING HYDROCARBON VAPORS FROM A FLUIDIZED SPENT CATALYST

Carl S. Kelley, Bartlesville, Okla., assignor to Phillips Petroleum Company, a corporation of Delaware Application December 22, 1950, Serial No. 202,388

2 Claims. (Cl. 34—57)

This invention relates to a method and apparatus for removing a gaseous or vaporous fluid from a fluidized mass of particulate material. In one of its aspects the invention relates to the removal of a gaseous and/or adsorbed fluid from a free-falling or a fluidized mass of particulate material, for example, a hydrocarbon conversion catalyst, by displacing and/or removing the gaseous and/or adsorbed fluid with other fluid, for example, steam or other inert fluid or medium, in a manner, and employing a form of apparatus, as set out herein.

The invention is of particular interest to the hydrocarbon conversion art. For this reason, it will be described as applied in said art. It will be obvious, upon a reading of this disclosure, that the invention can be and is applicable in and to other arts.

Particularly in the hydrocarbon conversion art, in which great masses of fluidized catalyst or particulate material are moved through the various units, for example, in the moving bed or fluid catalyst operations, at various parts of the apparatus employed there is experienced a certain amount of erosion which necessitates constant care, inspection and ultimate replacement of parts. Thus, at least for this reason, there have been proposed various methods and means for displacing hydrocarbon vapors from fluidized spent catalyst before the said catalyst is admitted to the regeneration zone wherein it is subjected to oxidizing conditions. The prior art methods and means have in some instances been successful to reduce erosion at the places of vapor displacement but no method which has been entirely satisfactory has been devised.

Another factor to be considered in the catalyst regeneration practice is that any oil or vapor entrained as such or adsorbed by the catalyst into the regeneration zone will reduce its overall burning capacity because the charging capacity of most units is determined by their carbon burning capacity. Accordingly a more efficient removal of oil and vapor from the catalyst on its way to the regeneration zone is highly desirable.

To effectively strip entrained oil or vapor from a fluid type or fluidized catalyst it is necessary to cause efficient contact with each particle thereof. Therefore, since the least possible amount of stripping medium, for example, steam, is desirably employed for recovery reasons, and the contact is to be efficient, means to effectively strip the catalyst but not cause avoidable erosion are and have been desired.

It is among the objects of this invention to provide a method and apparatus to efficiently strip entrained fluid from a fluid type conversion catalyst in a manner such that avoidable erosion is substantially reduced.

Other objects and advantages are apparent from this disclosure, the drawings and the appended claims.

According to this invention it has been found that if the used or "spent" fluid catalyst is allowed to fall freely or to progress downwardly, for example, in sheet or sheet-like form, and steam is passed therethrough substantially horizontally, that the entrained and/or adsorbed fluid or vapor can be removed therefrom with ease, efficiency and with least possible erosion of the apparatus, as will be obvious to the reader from a consideration of the ensuing portions of this disclosure.

Thus, according to this invention there is provided a method and apparatus for displacing a fluid from a fluid type catalyst which comprises causing said catalyst to travel downwardly and passing a displacing medium horizontally therethrough. In one embodiment of the method, steam is employed to remove from the catalyst the fluid, which as stated, can be hydrocarbon oil and/or oil vapors. The oil and its vapors are removed or displaced from the downwardly moving catalyst by blowing or injecting steam horizontally into and therethrough, preferably at a multiplicity of points or places and withdrawing the steam together with the removed or displaced oil and vapors at a multiplicity of points corresponding to said points of injection. To this end the apparatus according to this invention will comprise means for causing the catalyst to travel downwardly, means for injecting the displacement fluid horizontally into and through said catalyst and means for withdrawing the injected displacement fluid and displaced oil and vapors from the apparatus at a point or points corresponding to said point or points of injection.

It will be obvious that the apparatus can take several forms within the scope of this disclosure, the drawings and the claims. Some of these forms are illustrated in the drawings in which Figure 1 is an elevational cross-section of apparatus according to this invention in which one manner of treating catalyst particles according to the invention can be effected. Figure 1A is an isometric view of the stripping medium injector of Figure 1. Figure 1B is an elevational diagram showing a combination of three units of apparatus as shown in Figure 1. Figure 2 is an elevational cross-section of another form of apparatus according to the invention suited for another manner of effecting the process of the invention, as will be explained. Figure 2A is a plan view along line 2A—2A of Figure 2. Figure 3 is still another form of apparatus suited to still another manner of effecting the process of the invention, as will be explained. Figure 3A is another view of the catalyst inlet to the stripping chamber and shows the distributor funnel thereof turned through a 90° angle. Figure 4 is a plan cross-sectional view of a specific stripping medium injector, guide plates and stripping medium collectors and Figure 5 is a view taken along 5—5 of Figure 4. Finally, Figure 6 is an isometric view of baffles which can be attached to or form a part of the guide plates in Figure 4.

From the following detailed discussion of the various figures of the drawings it is evident that the process of the invention, that is, the removal of entrained and/or adsorbed hydrocarbons, or other material, can be accomplished in both light and dense phases, or in a combination of them, at a low or at a high temperature, or at high and low temperatures, employed alternately, employing high or low velocity stripping medium.

Referring now to Figure 1, stripping steam, preferably at a high temperature and preferably at a high velocity, is injected through inlet 3 into the vessel 40 wherein it impinges at right angles upon the catalyst emerging from the reactor through inlet 30 into the stripper vessel. As the steam contacts the catalyst particles these are heated as well as swept of any entrained oil or vapor. The heat assists in driving off any adsorbed oil from the pores of the catalyst particles. As the particles are hit by the steam they gather momentum and are dispersed from the dense phase to the light phase section of the stripper vessel. Also, as this occurs the temperature of the particles will quickly drop from the maximum reached, although it is noted that the particles can be maintained at a sufficiently elevated temperature to prevent any substantial readsorption of the hydrocarbons. The vapors are separated from any entrained particles or fines in collector 5, which is open at its top and can be recycled to the reactor or any place desired while the catalyst is collected at the bottom of the stripper vessel and discharged through outlet 6. As stated Figure 1B shows a combination of several units as just described. It will be noted that, in effect, the apparatus and method of Figures 1 and 1B direct steam horizontally against a downwardly moving mass of particles or catalyst, resuming the maximum removal of entrained and/or adsorbed material with a minimum of erosion of apparatus, steam, and effort.

While the steam injector is shown, at Figure 1A, to be in the form of a T with a slit 7 across its top 8, thus to provide the steam in a substantially horizontal sheet, it is clearly within the scope of the invention to employ an equivalent injector or injectors. Thus in the place of a slit T a perforated T or even several T's, or their equivalent, can be employed.

In Figures 2 and 2A is shown a modification of apparatus in which steam is injected into chamber 12 through manifold 9 and injector 10 into and through the catalyst, in substantially a horizontal direction, and then collected in the vapor collector 11, which is open at the top. Catalyst collectors 13 are provided as shown to collect and reshape the falling catalyst. The stripping in this modification is more or less in the dense phase throughout the operation. Also the steam passes through the catalyst mass at a low velocity.

Referring now to Figure 3, catalyst from which gases or vapors are to be displaced is fed from the reactor through the slide valve 14 into the top of an elongated chamber 15 located in the catalyst standpipe 19 and removed from the bottom thereof through a slide valve 16 operated by a level controller 17 as shown. The catalyst in the lower portion of the chamber is in a free-falling, fluid or fluidized condition, a low level of it in said chamber being maintained by the level controller 17, as indicated. Figure 3A shows that the aperture 18 through which the catalyst emerges, preferably free-falling, into the elongated chamber is shaped to spread out into more or less sheet form the downwardly moving catalyst, the sheet being maintained substantially at right angles to steam which is injected from the left side of the elongated chamber through a multiplicity of points, or injectors 20, employing a suitable manifold 21 for this purpose. The steam travels substantially horizontally through the downwardly moving catalyst sheet and is collected, together with fluid displaced from said catalyst, at a multiplicity of points, or collector openings 22 in a header 23, at the other side of the reactor and withdrawn therefrom through a valve 24 which can be controlled by the pressure in the chamber. Any entrained catalyst settles out in the header and is withdrawn therefrom at 1.

If the catalyst has become diverted after falling a distance it is possible simply to reverse the direction of flow of stripping medium to, as it were, redirect the catalyst to its path of flow. Indeed, by placing the injectors along a spiral travelling down the stripping chamber wall and similarly locating corresponding collectors, it becomes possible, even in this modification, to increase somewhat either the velocity of the stripping medium and/or the length of path of flow of the catalyst. The steam or stripping medium in such a modification would still impinge upon the the catalyst horizontally at a right angle to its path of flow. The modifications just described are readily understood on the basis of the drawings already described and are therefore not illustrated.

A consideration of the figures will show that the construction of the apparatus, mechanically speaking, is very simple. It will also show that the arrangement of the various co-acting parts of the apparatus is such that little or no erosion can be caused by the downwardly moving catalyst.

It will be noted, as stated, that the advantage of right-angular contact of the displacing fluid, or steam, with particles is obtained according to this invention. Also to be noted is the fact that the arrangements maintain contact of fresh steam with the particles of catalyst at all times. This type of contact constantly provides steam of the greatest displacing, or holding of fluid, or vapor entraining capacity and is to be distinguished from counter-current flow in which only the particles leaving the chamber would meet fresh steam and wherein the particles containing the most fluid to be displaced or removed from the particles is contacted with only more or less fully used steam. Those skilled in the art will recognize that the arrangement according to this invention gives much the same type of extraction of entrained fluid gases or vapors from the downwardly moving catalyst as is obtained in the solvent extraction art wherein, rather than put all of the solvent together with all of the fluid to be extracted, small portions of the solvent are contacted at different times with the material to be extracted, thus more fully extracting said material than when the former procedure is applied. Figures 4 and 5 show the general arrangement of guide plates 4 which are useful, as a feature of the invention, to direct the steam, and catalyst into intimate and smooth flow contact with each other. The guide plates shown are vertically placed. Thus, the vertical plates provided divide the chamber into cells and the steam injection points or nozzles 25 are, as shown, spaced both vertically and horizontally to treat each portion or subdivided sheet of down-flowing catalyst. In this modification the advantages accruing from the employ of the manner of operation and construction of Figures 2 and 3 are more fully realized. Thus, cross flow of the stripping medium to the collection header is more uniform throughout the treating section of the chamber and even less turbulence of the down-flowing catalyst as a whole can occur. When desired to create catalyst turnover within each section of the subdivided down-flowing catalyst sheet, baffles 26 as shown in Figure 6 can be applied to the plates. The baffles 26 of Figure 6 may be positioned at a slight angle to the vertical and rows of such baffles may be placed one beneath the other, alternate rows being inclined oppositely to rows in between them so that a slight or substantial zigzag, if desired, can be imparted to the down-flowing sections of the subdivided catalyst sheet.

Reasonable variation and modification are possible within the scope of the foregoing disclosure, drawing and the appended claims to the invention the essence of which is that a method and apparatus for the efficient removal or displacement of entrained and/or adsorbed fluid from a fluid mass of catalyst particles with minimum of erosion to both catalyst and equipment has been set forth embodying steps and means whereby a displacing medium is passed through a downwardly moving sheet of the mass of particles, the medium being injected into said mass from a point, or injector, along its downward path of travel and caused to pass therethrough in a substantially horizontal direction either in turbulent or in streamline flow and collected at the other side thereof by means of a collector arranged substantially opposite to said point of injection.

I claim:

1. Apparatus, for stripping fluid from a finely divided, used, hydrocarbon conversion catalyst, said apparatus comprising, in combination: a stripping chamber having a greater depth on one side than on the other; a catalyst inlet adapted to admit said catalyst in a freely falling state into the top of said chamber; a catalyst outlet in the bottom of said chamber and horizontally offset with respect to said inlet; said inlet being positioned in the top of said chamber at the side of lesser depth and said outlet being positioned in the bottom of said chamber at the side of greater depth; displacing fluid nozzle means positioned below and immediately adjacent said inlet and adapted to direct displacing fluid transversely against falling catalyst; and fluid collection means positioned in said chamber at the side of greater depth.

2. Apparatus, for stripping fluid from a finely divided, used, hydrocarbon conversion catalyst, said apparatus comprising, in combination: a stripping chamber having a greater depth on one side than on the other; a catalyst inlet comprising a substantially horizontal, elongated slit-shaped opening adapted to admit catalyst in a freely falling state into the top of said chamber; a catalyst outlet in the bottom of said chamber and horizontally offset with respect to said inlet; said inlet being positioned in the top of said chamber at the side of lesser depth and said outlet being positioned in said chamber at the side of greater depth; displacing fluid nozzle means positioned below and immediately adjacent said inlet and adapted to direct displacing fluid transversely against falling catalyst, said nozzle means comprising a horizontally elongated slit disposed substantially parallel to said opening of said catalyst inlet.

References Cited in the file of this patent

UNITED STATES PATENTS

| Number | Name | Date |
|---|---|---|
| 516,114 | Riley | Mar. 6, 1894 |
| 533,929 | Taylor | Feb. 12, 1895 |
| 789,807 | Holl | May 16, 1905 |
| 1,185,623 | Boss | June 6, 1916 |
| 1,787,878 | Warden-Stevens | Jan. 6, 1931 |
| 1,836,325 | James | Dec. 15, 1931 |
| 2,270,903 | Rudbach | Jan. 27, 1942 |
| 2,384,891 | Collins et al. | Sept. 18, 1945 |
| 2,395,632 | Litty, Jr. | Feb. 26, 1946 |
| 2,416,230 | Simpson | Feb. 18, 1947 |
| 2,472,459 | Banks | June 7, 1949 |
| 2,474,199 | Lechthaler et al. | June 21, 1949 |
| 2,489,863 | Collins et al. | Nov. 29, 1949 |
| 2,493,218 | Bergstrom | Jan. 3, 1950 |
| 2,541,801 | Wilcox | Feb. 13, 1951 |
| 2,553,561 | Evans | May 22, 1951 |